Patented Oct. 25, 1949

2,486,192

UNITED STATES PATENT OFFICE 2,486,192

GEL-TYPE IMIDIZED POLYACRYLAMIDE

Louis M. Minsk and William O. Kenyon, Rochester, N. Y., assignors to Eastman Kodak Company, Rochester, N. Y., a corporation of New Jersey No Drawing. Application February 8, 1947, Serial No. 727,302

12 Claims. (Cl. 260—89.7)

This invention relates to partially neutralized imidized polyacrylamides which form reversible gels in aqueous solution and to a process for their preparation. This application is a continuation in part of our copending application Serial No. 685,376, filed July 22, 1946.

Synthetic resins having the property of forming aqueous suspensions (having the structure of a gel) have been described heretofore. For example, resins which swell or dissolve in water, and coatings of which give elastic films, have been made by partially saponifying resins having ester groups such as a polyacrylic acid alkyl ester, or its copolymeric resins, with a base such as sodium hydroxide. Other resins having similar properties have been made by saponifying some of the acid amide groups of a polyacrylamide resin to corresponding acid salt groups, or by completely neutralizing the acid groups of a copolymer of, for example, acrylamide and acrylic acid. Still other resins described as having properties of forming gel solutions have been made by reacting monomeric acrylamide or polyacrylamide with formaldehyde. However, none of the above type of gels are temperature reversible and capable of chill-setting to a solid form, that is, capable of being re-melted and re-chilled as necessary, and curable in this chilled, non-flowable form.

We have now found that good quality synthetic reversible gels which set on chilling and can be re-melted and re-chilled any number of times, and which are hardenable by such reagents as formaldehyde, zirconium salts and other tanning agents can be made by partially neutralizing imidized polyacrylamides of limited chemical compositions. Our new compounds are useful colloidizing agents and valuable in the manufacture of solutions for sizing and impregnating various fibrous materials, as well as for making useful sheet and object forming compositions. In many respects, our new products are even better than natural ones used for the same purposes, because the process of their synthesis provides compounds of more consistent uniformity.

The new gel-forming products of our invention can be made by treating water-soluble polyacrylamides in aqueous solution with an acid having a dissociation constant greater than $1 \times 10^{-3}$, for example, hydrobromic, hydrochloric, sulfuric, nitric, phosphoric, tartaric, malonic, oxalic, dichloracetic, p-toluene sulfonic or perchloric acid, to form a product consisting of three kinds of groups making up the molecule in linear relation, that is, amide; acrylic acid and cyclic imide groups, structurally illustrated by the following formula:

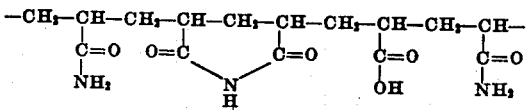

and then neutralizing a critical proportion of the free carboxyl groups with ammonia, organic amines such as aniline, pyridine, diethylamine, triethanolamine, ethylene diamine, trimethyl benzyl ammonium hydroxide, and the like, sodium hydroxide, lithium hydroxide, potassium hydroxide, caesium hydroxide and other inorganic bases of similar kind which form water-soluble salts to obtain products whose aqueous solutions in 1 to 20 per cent concentrations form reversible gels at some temperature range between 0° and 100° C. The above formula should be considered only as illustrative with no attempt made to place the respective groups upon an exact quantitative or spatial relationship. However, for analytical and definitive purposes, the groups shown represent combined acrylic acid,

combined acrylimide

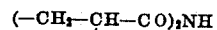

and combined acrylamide

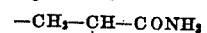

The molecular weight of the gel product can be varied by the conditions of polymerization of the original monomeric acrylamide. By conducting the polymerization of the latter in aqueous solution or in water-alcohol mixtures, in the presence of varying concentrations of hydrogen peroxide, a series of water-soluble polyacrylamides of variable molecular weight as measured by the viscosities of their aqueous solutions, can be prepared. The method is to place an amount of aqueous acrylamide in an all-glass reflux apparatus, add the required amount of hydrogen peroxide and heat the reaction mixture at about 90° C. for the desired length of time. At the end of this time, the polymer is imidized while still in solution by the addition of the imidizing acid. The imidized products are characterized by precipitating from their aqueous solutions when the pH and temperature of the solution are lowered, that is, the acid form precipitates at some temperature above 0° C., without passing through a gel state. Upon partial neutralization of the imidized product, gel products of varying molecular weights are obtained.

We have found further, however, that the power to gel depends principally upon the relative amounts of the three groups present in the molecule, and upon the number of carboxyl groups converted by neutralization to a salt form. In general, the initial water-soluble imidized polyacrylamides from which our new gel compounds are made can very from 21 to 67 per cent by weight of combined acrylimide groups, from 5 to 27 per cent by weight of combined acrylic acid groups, and the remainder of the weight of the imidized polyacrylamide of combined acrylamide groups. High quality gels can be obtained from imidized polyacrylamides coming within the above limits by converting from 3 to 55 per cent of the combined acrylic acid groups of the imidized polyacrylamides to a salt form with a base of the kind previously mentioned. If the neutralization of the combined acrylic acid groups substantially exceeds 55 per cent, no gelation of the aqueous solution of such excessively neutralized imidized polyacrylamide will take place on cooling the solution to 0° C., even though the combined acrylimide groups content is greater than the lower limit of 21 per cent and the combined acrylic acid groups content is greater than the lower limit of 5 per cent. This result is not altered materially by increasing the concentration of the partially neutralized imidized polyacrylamide in solution up to about 20 per cent. In this connection, it should be mentioned that our products which have a relatively higher molecular weight will form gels in aqueous solutions at concentrations as low as one per cent, whereas the products of our invention of relatively lower molecular weight will form gels in aqueous solutions only at greater concentrations, and in the case of extremely low molecular weight products, at concentrations as high as 15 to 20 per cent. The pH of the aqueous gel solutions prepared with our new compounds range of about from 3.5 to 5.0 at 40° C., depending upon the base compound used for converting the combined acrylic acid groups to the salt form. In general, we have found that the higher the pH value, the softer and clearer will be the resulting gel, and the lower will be the temperature of gelation.

It is the purpose of this invention to provide partially neutralized, imidized polyacrylamides which in aqueous solution form reversible and chill-setting gels. Another object is to provide a method for the preparation of the same. Other objects will become apparent hereinafter.

The following examples and tables will serve further to illustrate our invention.

EXAMPLE I 100 grams of acrylamide were polymerized in 1000 c. c. of distilled water with 2.0 c. c. of 30 per cent hydrogen peroxide in an all-glass apparatus by heating the mixture for a period of one and one-half hours at 90° C. The clear, viscous dope obtained was diluted with 1500 c. c. of distilled water, the mixture stirred to a homogeneous mass and 250 c. c. of 48 per cent hydrobromic acid (0.758 gram of hydrogen bromide per c. c.) added. The dope was thoroughly mixed and returned to the 90° C. bath. A 600 gram sample was withdrawn after one hour heating, and precipitated in 3 liters of methanol, and the precipitate extracted with fresh portions of methanol until free from bromide ion, and then dried in a vacuum desiccator under constant water pump vacuum. The dried resin was analyzed, made up in aqueous solution and the combined acrylic acid groups partially neutralized with 0.11 normal sodium hydroxide solution. Other samples of similar size were withdrawn at progressively increasing intervals of heating time and treated as described. The data are presented in the following table. Column 1 represents the time in hours that the sample of polyacrylamide was treated in aqueous solution with hydrobromic acid at 90° C. Columns 2, 3, 4 and 5 represent the per cent by weight of nitrogen, combined acrylic acid, combined acrylimide and combined acrylamide making up the molecule of the resin after imidization of the polyacrylamide for the specified reaction time. Column 6 represents the relative viscosity of the imidized polyacrylamide, determined by dissolving 2 grams of the imidized polymer in 100 c. c. of 0.5 per cent (as $NH_3$) ammonium hydroxide solution, the relative viscosity being the time of flow of the solution through a pipette divided by the time of flow of the solvent under the same conditions. Column 7 represents the percentage of the free acrylic acid groups neutralized into salt form with dilute sodium hydroxide solution. Column 8 represents the minimum concentration at which gelling of the partially neutralized imidized polyacrylamide takes place.

TABLE I

*Imidized polyacrylamide—percent by weight*

| Reaction Time in Hours | Nitrogen | Acrylic Acid | Imide | Amide | Relative Viscosity |
|---|---|---|---|---|---|
| 1 | 17.95 | 3.1 | 13.8 | 83.1 | 13 |
| 1.5 | 16.77 | 5.3 | 21.4 | 73.3 | 24 |
| 2.0 | 15.97 | 7.4 | 27.0 | 65.6 | 39 |
| 2.5 | 15.43 | 9.2 | 28.9 | 61.9 | 53 |
| 3.0 | 14.61 | 10.8 | 35.2 | 54.0 | 67 |

*After neutralization*

| Reaction Time in Hours | Percent Acrylic Neutralized | Gel Solution |
|---|---|---|
| 1 | 0 | No gelation, Clear solution. |
| 1.5 | 30 | 2% solution forms soft gel. |
| 2.0 | 32 | 4% solution forms soft gel. |
| 2.5 | 22 | 2% solution forms soft gel. |
| 3.0 | 15 | Do. |

EXAMPLE II 100 grams of acrylamide were polymerized in 1000 c. c. of distilled water with 10 c. c. of 30 per cent hydrogen peroxide in an all-glass apparatus by heating the mixture for a period of one and one-half hours at 90° C. The clear, viscous dope obtained was diluted with 1500 c. c. of distilled water, the mixture stirred to a homogeneous mass and 250 c. c. of 48 per cent hydrobromic acid (0.758 gram of hydrogen bromide per c. c.) added. The dope was thoroughly mixed and returned to the 90° C. bath. Samples were withdrawn at intervals, precipitated, and the resins obtained washed in methanol and dried under vacuum, analyzed for nitrogen, combined acrylic acid, combined acrylimide and combined acrylamide, the relative viscosities determined, and then partially neutralized in aqueous solution with dilute sodium hydroxide solution and the gelation properties tested. The data are presented in the following table, the meanings of the various columns being the same as defined in preceding Table I.

TABLE II

*Imidized polyacrylamide—*
*Percent by weight*

| Reaction Time in Hours | Nitrogen | Acrylic Acid | Imide | Amide | Relative Viscosity |
|---|---|---|---|---|---|
| 2.75 | 14.00 | 11.6 | 40.4 | 48.0 | 4.3 |
| 3.75 | 13.40 | 13.7 | 42.6 | 43.7 | 2.1 |

*After neutralization*

| Reaction Time in Hours | Per Cent Acrylic Neutralized | Gel Solution |
|---|---|---|
| 2.75 | 21 | 4% solution forms soft gel. |
| 3.75 | 18 | 6% solution forms gel. |

EXAMPLE III 100 grams of acrylamide were polymerized in 1000 c. c. of distilled water with 20 c. c. of 30 per cent hydrogen peroxide in an all-glass apparatus by heating the mixture for a period of one and one-half hours at 90° C. The clear viscous dope obtained was diluted with 1500 c. c. of distilled water, the mixture stirred to a homogeneous mass and 250 c. c. of 48 per cent hydrobromic acid (0.758 gram of hydrogen bromide per c. c.) added. The dope was thoroughly mixed and returned to the 90° C. bath. Samples were withdrawn at intervals, the resin precipitated out and washed in methanol, dried under vacuum, analyzed for nitrogen, combined acrylic acid, combined acrylimide and combined acrylamide, the relative viscosities determined, and then partially neutralized in aqueous solution with dilute sodium hydroxide solution and the gelation properties tested. The data are presented in the following table, the respective columns having the same meanings are defined in preceding Table I.

TABLE III

*Imidized polyacrylamide—*
*Percent by weight*

| Reaction Time in Hours | Nitrogen | Acrylic Acid | Imide | Amide | Relative Viscosity |
|---|---|---|---|---|---|
| 3.0 | 13.40 | 12.2 | 46.0 | 41.8 | 2.1 |
| 3.17 | 13.30 | 13.1 | 45.1 | 41.8 | 1.6 |

*After neutralization*

| Reaction Time in Hours | Per Cent Acrylic Neutralized | Gel Solution |
|---|---|---|
| 3.0 | 20 | 10% solution forms soft gel. |
| 3.17 | 21 | 9% solution forms very soft gel. |

EXAMPLE IV 100 grams of acrylamide were polymerized in 1000 c. c. of distilled water with 2.0 c. c. of 30 per cent hydrogen peroxide in an all-glass reflux apparatus for a period of one and one-quarter hours at 90° C. To the clear viscous dope obtained, there were added 1500 c. c. of distilled water and 250 c. c. of concentrated hydrobromic acid (0.787 gram of hydrogen bromide per c. c.), and after being thoroughly mixed, the dope was heated on a steam bath until two phases began to form. The mixture, still acid to Congo red indicator, was poured into 10 liters of methanol with stirring, and the granular precipitate obtained was extracted free from bromide ion with fresh portions of methanol. The product was dried in a vacuum desiccator under a constant water pump vacuum, followed by two hours in an air oven at 55° C. The yield was 76 grams. The product analyzed per cent by weight as follows:

Nitrogen _____ 13.80
Combined acrylic acid _____ 13.8
Combined acrylimide _____ 43.3
Combined acrylamide _____ 43.9

On heating a sample of the resin in water at 100° C., a turbid solution was obtained, which increased in turbidity on cooling. However, upon the addition of small amounts of base, the temperature at which a clear solution was obtained progressively lowered, and the clear dope on cooling formed a gel instead of a precipitate. Accordingly, one gram of the above imidized resin was suspended in 20 c. c. of distilled water and the suspension heated to 80° to 85° C. Aqueous sodium hydroxide of 0.1103 normal strength was added in one-half cubic centimeter portions, until a clear solution was obtained. Two and one-half cubic centimeters were required. At this point, 14.4 per cent by weight of the combined acrylic acid groups were neutralized. A portion of the hot dope was coated on a glass plate at room temperature. In a short time, the coating had set to a soft gel, which dried to a clear film on standing. The main portion of the dope was immersed in a bath of cold water. Soon the dope had set to a translucent, moderately firm gel which softened but did not become fluid until warmed above room temperature.

EXAMPLE V

In an all-glass reflux apparatus there were placed 50 grams of acrylamide, 500 c. c. of distilled water and 1.0 c. c. of 30 per cent hydrogen peroxide. The reaction mixture was heated in a bath maintained thermostatically at 90° C., for a period of one and one-half hours. A viscous dope was obtained. To this dope there were then added 412.5 c. c. of distilled water, the mixture stirred to homogeneity, and 405 c. c. of concentrated nitric acid (1.068 grams of $HNO_3$ per c. c.) added. After stirring thoroughly once more, the dope was returned to the 90° C. bath for two hours. A turbid, viscous solution was obtained. While still hot, the dope was poured into two and one-half liters of ice and water mixture, the product being precipitated in the form of a fibrous mass. This was washed free from acid with distilled water maintained at room temperature. The product was extracted twice with 600 c. c. portions of methanol, allowing one hour soaking period for each extraction. It was dried in a vacuum desiccator under constant vacuum and then for five hours in an open dish at 55° C. The yield was 33 grams. Analysis of this product showed by weight 28.1 per cent of combined acrylic acid, 67.7 per cent combined acrylimide and 4.2 per cent of combined acrylamide.

EXAMPLE VI

An imidized polyacrylamide was prepared by the procedure described in Example IV. This product gave the following figures on analysis:

Nitrogen _____per cent by weight__ 13.34
Combined acrylic acid _____do____ 13.6
Combined acrylimide _____do____ 43.5
Combined acrylamide _____do____ 42.9
Relative viscosity _____ 32.4

A warm dope was made up in water at 4 per cent concentration and portions treated with various nitrogen bases. The treated portions were then cooled and the gelation condition of the dopes noted at 0° C. and at room temperature. The data are listed in the following table:

TABLE IV

| Base Added | c. c. of 0.1 Normal base added/gram | Approximate Per Cent Combined Acrylic Neutralized | Condition of Solution | |
|---|---|---|---|---|
| | | | at 0° C. | at Room Temp. |
| Ammonium hydroxide | 3 | 15.9 | Firm, turbid gel | Soft, turbid gel. |
| Aniline | 4 | 21.2 | Stiff gel, translucent | Gel yields but does not flow. |
| Diethylamine | 4 | 21.2 | Stiff gel, slight haze | Soft gel, some flow on inversion. |
| Triethanolamine | 5 | 26.4 | White firm gel | Opalescent gel, yields but does not flow. |
| Triethanolamine | 10 | 53.0 | Stiff, opalescent gel | Do. |
| Trimethyl ammonium hydroxide | 4 | 21.2 | ____do____ | Gel yields but does not flow. |
| Ethylene diamine | 5 | 26.4 | ____do____ | Opalescent gel which yields but does not flow. |
| Pyridine | 4 | 21.2 | Almost clear, stiff gel | Does not flow. |

EXAMPLE VII 8 grams of the imidized polyacrylamide of Example VI were stirred at 90° C. with 180 grams of water and 4 c. c. of 0.552 normal sodium hydroxide solution, until a smooth dope was obtained. The total weight was adjusted to 194 grams. The dope was then cooled to 40° C. and maintained at this temperature, while further additions were made of the standard sodium hydroxide solution. At intervals, approximately 1 c. c. samples of the dope were transferred to test tubes and tested for gelation at 0° C. and at room temperature. These results are given in Table V. The first column represents the per cent of the combined acrylic acid groups neutralized, the second column the pH of the solution, and the last column the gelation behavior.

tralization of the combined acrylic acid groups, and still obtain satisfactory gelation. This is probably due to the fact that the emulsion is laid down in thin layers and to the bulk effect of the suspended silver halide.

What we claim is:

1. An imidized polyacrylamide which forms a temperature reversible gel in aqueous solution and which contains combined acrylimide groups, combined acrylic acid groups and combined acrylamide groups, the combined acrylimide groups constituting from 21 to 67 per cent by weight of the imidized polyacrylamide, the combined acrylic acid groups constituting from 5 to 27 per cent by weight of the imidized polyacrylamide, the remainder of the weight of the imidized polyacrylamide being combined acrylamide groups, wherein from 3 to 55 per cent of the combined acrylic acid groups are in a salt form selected from the group consisting of ammonium, organic amine and alkali metal salts.

2. An imidized polyacrylamide which forms a temperature reversible gel in aqueous solution and which contains combined acrylimide groups, combined acrylic acid groups and combined acrylamide groups, the combined acrylimide groups constituting from 21 to 67 per cent by weight of the imidized polyacrylamide, the combined acrylic acid groups constituting from 5 to 27 per cent by weight of the imidized polyacrylamide, the remainder of the weight of the imidized polyacrylamide being combined acrylamide groups, wherein from 3 to 55 per cent of the combined acrylic acid groups are in alkali metal salt form.

3. An imidized polyacrylamide which forms a temperature reversible gel in aqueous solution and which contains combined acrylimide groups, combined acrylic acid groups and combined acrylamide groups, the combined acrylimide

TABLE V

| No. of Test | Per cent of Acrylic Acid Groups Neutralized | pH | Gelation Behavior |
|---|---|---|---|
| 1 | 0 | Less than 4.0 | No gel formed at room temperature. Dope was white and thin with a gelatinous precipitate. |
| 2 | 2.9 | Less than 4.0 | Showed gel structure at 60° C. Gel at room temperature definite, but softer than 3 and turbid. |
| 3 | 5.8 | Less than 4.0 | Gel structure at 54° C. Gel at room temperature firmer and less turbid than that of 2. |
| 4 | 14.7 | 4.11 | Dope turbid at 40° C. Gel at room temperature. |
| 5 | 18.3 | 4.15 | Gel at room temperature with some flow on inversion. |
| 6 | 22.0 | 4.23 | Gel at room temperature with some flow on inversion. No flow at 0° C. |
| 7 | 29.3 | 4.37 | Soft gel at room temperature with flow. Gel at 0° C. with no flow. |
| 8 | 33.0 | 4.44 | Do. |
| 9 | 36.6 | 4.53 | Gel at 0° C. No flow. |
| 10 | 40.2 | 4.63 | Do. |
| 11 | 43.9 | 4.70 | Gel at 0° C. Some flow. |
| 12 | 47.0 | 4.76 | Weak gel at 0° C. |
| 13 | 51.2 | 4.83 | Border line at 0° C. Dope flows on inversion, but less freely than 14, indicating residual structure. |
| 14 | 55.0 | 4.91 | Dope flows at 0° C. more freely than 13, but less freely than 15. Some residual gel structure. |
| 15 | 58.5 | 4.99 | Flows freely at 0° C. No apparent gel structure. |

In addition to the uses already mentioned, our new gel-type imidized polyacrylamides can be used as vehicles for the preparation of light sensitive photographic emulsions of the silver halide type. In the making of such emulsions, we have found it possible to use our products at somewhat higher pH (5.0), or higher degree of neugroups constituting from 21 to 67 per cent by weight of the imidized polyacrylamide, the combined acrylic acid groups constituting from 5 to 27 per cent by weight of the imidized polyacrylamide, the remainder of the weight of the imidized polyacrylamide being combined acrylamide groups, wherein from 3 to 55 per cent of the combined acrylic acid groups are in sodium salt form.

4. An imidized polyacrylamide which forms a temperature reversible gel in aqueous solution and which contains combined acrylimide groups, combined acrylic acid groups and combined acrylamide groups, the combined acrylimide groups constituting 42.3 per cent by weight of the imidized polyacrylamide, the combined acrylic acid groups constituting 13.8 per cent by weight of the imidized polyacrylamide and the combined acrylamdie groups constituting 43.9 per cent by weight of the imidized polyacrylamide, wherein 14.4 per cent of the combined acrylic acid groups are in a sodium salt form.

5. An imidized polyacrylamide which forms a temperature reversible gel in aqueous solution and which contains combined acrylimide groups, combined acrylic acid groups, combined acrylamide groups, the combined acrylimide groups constituting 27.0 per cent by weight of the imidized polyacrylamide, the combined acrylic acid groups constituting 7.4 per cent by weight of the imidized polyacrylamide and the combined acrylamide groups constituting 65.6 per cent by weight of the imidized polyacrylamide, wherein 32 per cent of the combined acrylic acid groups are in a sodium salt form.

6. An imidized polyacrylamide which forms a temperature reversible gel in aqueous solution and which contains combined acrylimide groups, combined acrylic acid groups and combined acrylamide groups, the combined acrylimide groups constituting 43.5 per cent by weight of the imidized polyacrylamide, the combined acrylic acid groups 13.6 per cent by weight of the imidized polyacrylamide and the combined acrylamide groups constituting 42.9 per cent by weight of the imidized polyacrylamide, wherein 54.8 per cent of the combined acrylic acid groups are in a sodium salt form.

7. In a process for the preparation of a temperature reversible gel-type imidized polyacrylamide wherein a water-soluble polyacrylamide is treated in aqueous solution with an acid selected from the group consisting of hydrobromic, sulfuric, nitric, hydrochloric, phosphoric, dichloroacetic, p-toluene sulfonic, oxalic, tartaric and malonic acids, to give an imidized polyacrylamide containing combined acrylimide groups, combined acrylic acid groups and combined acrylamide groups, the combined acrylimide groups constituting from 21 to 67 per cent by weight of the imidized polyacrylamide, the combined acrylic acid groups constituting from 5 to 27 per cent by weight of the imidized polyacrylamide, the remainder of the weight of the imidized polyacrylamide being combined acrylamide groups, the step which comprises neutralizing from 3 to 55 per cent of the combined acrylic acid groups with a base selected from the group consisting of ammonia, an organic amine and an alkali metal base.

8. In a process for the preparation of a temperature reversible gel-type imidized polyacrylamide wherein a water-soluble polyacrylamide is treated in aqueous solution with an acid selected from the group consisting of hydrobromic, sulfuric, nitric, hydrochloric, phosphoric, dichloroacetic, p-toluene sulfonic, oxalic, tartaric and malonic acids, to give an imidized polyacrylamide containing combined acrylimide groups, combined acrylic acid groups and combined acrylamide groups, the combined acrylimide groups constituting from 21 to 67 per cent by weight of the imidized polyacrylamide, the combined acrylic acid groups constituting from 5 to 27 per cent by weight of the imidized polyacrylamide, the remainder of the weight of the imidized polyacrylamide being combined acrylamide groups, the step which comprises neutralizing from 3 to 55 per cent of the combined acrylic acid groups with an alkali metal base.

9. In a process for the preparation of a temperature reversible gel-type imidized polyacrylamide wherein a water-soluble polyacrylamide is treated in aqueous solution with an acid selected from the group consisting of hydrobromic, sulfuric, nitric, hydrochloric, phosphoric, dichloroacetic, p-toluene sulfonic, oxalic, tartaric and malonic acids, to give an imidized polyacrylamide containing combined acrylimide groups, combined acrylic acid groups and combined acrylamide groups, the combined acrylimide groups constituting from 21 to 67 per cent by weight of the imidized polyacrylamide, the combined acrylic acid groups constituting from 5 to 27 per cent by weight of the imidized polyacrylamide, the remainder of the weight of the imidized polyacrylamide being combined acrylamide groups, the step which comprises neutralizing from 3 to 55 per cent of the combined acrylic acid groups with a sodium base.

10. In a process for the preparation of a temperature reversible gel-type imidized polyacrylamide wherein a water-soluble polyacrylamide is treated in aqueous solution with an acid selected from the group consisting of hydrobromic, sulfuric, nitric, hydrochloric, phosphoric, dichloroacetic, p-toluene sulfonic, oxalic, tartaric and malonic acids, to give an imidized poylacrylamide containing combined acrylimide groups, combined acrylimide groups, combined acrylic acid groups and combined acrylamide groups, the combined acrylimide groups constituting 42.3 per cent by weight of the imidized polyacrylamide, the combined acrylic acid groups constituting 13.8 per cent by weight of the imidized polyacrylamide and the combined acrylamide groups constituting 43.9 per cent by weight of the imidized polyacrylamide, the step which comprises adding sufficient dilute sodium hydroxide to an aqueous solution of the imidized polyacrylamide to convert 14.4 per cent of the combined acrylic groups to the sodium salt form.

11. In a process for the preparation of a temperature reversible gel-type imidized polyacrylamide wherein a water-soluble polyacrylamide is treated in aqueous solution with an acid selected from the group consisting of hydrobromic, sulfuric, nitric, hydrochloric, phosphoric, dichloroacetic, p-toluene sulfonic, oxalic, tartaric and malonic acids, to give an imidized polyacrylamide containing combined acrylimide groups, combined acrylic acid groups and combined acrylamide groups, the combined acrylimide groups constituting 27.0 per cent by weight of the imidized polyacrylamide, the combined acrylic acid groups constituting 7.4 per cent by weight of the imidized polyacrylamide and the combined acrylamide groups constituting 65.6 per cent by weight of the imidized polyacrylamide, the step which comprises adding sufficient dilute sodium hydroxide to an aqueous solution of the imidized polyacrylamide to convert 32.0 per cent of the combined acrylic groups to the sodium salt form.

12. In a process for the preparation of a temperature reversible gel-type imidized polyacrylamide wherein a water-soluble polyacrylamide is treated in aqueous solution with an acid selected from the group consisting of hydrobromic, sulfuric, nitric, hydrochloric, phosphoric, dichloroacetic, p-toluene sulfonic, oxalic, tartaric and malonic acids, to give an imidized polyacrylamide containing combined acrylimide groups, combined acrylic acid groups and combined acrylamide groups, the combined acrylimide groups constituting 43.5 per cent by weight of the imidized polyacrylamide, the combined acrylic acid groups constituting 13.6 per cent by weight of the imidized polyacrylamide and the combined acrylamide groups constituting 42.9 per cent by weight of the imidized polyacrylamide, the step which comprises adding sufficient dilute sodium hydroxide to an aqueous solution of the imidized poylacrylamide to convert 54.8 per cent of the combined acrylic groups to the sodium salt form.

LOUIS M. MINSK.
WILLIAM O. KENYON.

REFERENCES CITED

The following references are of record in the file of this patent:

UNITED STATES PATENTS

| Number | Name | Date |
|---|---|---|
| 2,133,257 | Strain | Oct. 11, 1938 |
| 2,289,540 | Dittmar | July 14, 1942 |

FOREIGN PATENTS

| Number | Country | Date |
|---|---|---|
| 475,671 | Great Britain | Nov. 24, 1937 |

OTHER REFERENCES

Staudinger et al.; Helv. Chem. Acta. (1929), pp. 1107–1133.